(12) United States Patent
Morrissey et al.

(10) Patent No.: US 7,006,298 B2
(45) Date of Patent: Feb. 28, 2006

(54) OPTICAL SYSTEM PROVIDING FOUR BEAMS FROM A SINGLE SOURCE

(75) Inventors: Kevin Marc Morrissey, Xenia, OH (US); Jason Alan Schaefer, Galloway, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/818,423

(22) Filed: Apr. 5, 2004

(65) Prior Publication Data

US 2005/0225870 A1 Oct. 13, 2005

(51) Int. Cl.
G02B 27/12 (2006.01)
G02B 27/10 (2006.01)

(52) U.S. Cl. ...................... 359/640; 359/618
(58) Field of Classification Search ................ 359/618, 359/641; 33/286, 290, 291, 295; 356/153
See application file for complete search history.

(56) References Cited

U.S. PATENT DOCUMENTS

| | | |
|---|---|---|
| 5,144,487 A | 9/1992 | Hersey |
| 5,307,368 A | 4/1994 | Hamar |
| 5,381,439 A | 1/1995 | English, Jr. et al. |
| 5,408,553 A | 4/1995 | English, Jr. et al. |
| 5,459,932 A | 10/1995 | Rando et al. |
| 5,500,524 A | 3/1996 | Rando |
| 5,617,202 A | 4/1997 | Rando |
| 6,005,716 A | 12/1999 | Ligtenberg et al. |
| 6,154,319 A | 11/2000 | Rando et al. |
| 6,282,028 B1 | 8/2001 | Waibel et al. |
| 6,292,303 B1 | 9/2001 | Hamar |
| 6,327,090 B1 | 12/2001 | Rando et al. |
| 6,529,329 B1 | 3/2003 | Dang |
| 6,542,304 B1 | 4/2003 | Tacklind et al. |
| 6,563,646 B1 | 5/2003 | Litvin |
| 6,590,712 B1 | 7/2003 | Schaller |
| 6,609,815 B1 | 8/2003 | Waibel et al. |
| 6,657,788 B1 | 12/2003 | Tacklind et al. |
| 6,694,630 B1 | 2/2004 | Dang et al. |
| 2004/0066558 A1* | 4/2004 | Weng .................. 359/618 |

FOREIGN PATENT DOCUMENTS

DE 3502382 A1 9/1985
EP 1 394 507 A 3/2004

* cited by examiner

Primary Examiner—Ricky Mack
(74) Attorney, Agent, or Firm—Dinsmore & Shohl, LLP

(57) ABSTRACT

A system to produce orthogonal beams includes a laser diode operating in conjunction with a collimating lens, an aperture, and a simple compact optic. Three collimated beams are directed toward an optic comprised of components that are bonded together. Beams are reflected from two optical components at right angles to produce plumb beams. Additionally, a beam is reflected from the optic at a right angle, as well as transmitted through the optic, to produce square and level beams. All four beams are orthogonal to each other, have relatively equal power, and are aligned and oriented so as to appear to be originating from a coincident point. Optionally, a fifth orthogonal beam may be produced. An optic in the shape of a cuboid comprised of six small components is also disclosed.

17 Claims, 8 Drawing Sheets

OPTICAL SYSTEM PROVIDING FOUR BEAMS FROM A SINGLE SOURCE

BACKGROUND OF THE INVENTION

The present invention generally relates to an optical system that may have utility in construction lay-out and, more specifically, to a system including a simple optic producing at least four orthogonal beams from an incoming collimated laser beam.

In the construction and home improvement industries, it is quite common for workers to determine level and square along a wall or potential wall site, as well as to find a plumb line from floor to ceiling, during the process of laying out a room. It is advantageous to make these measurements with one device at one time, and at a coincidental point. If the measurements are taken simultaneously with a single device from a coincidental point, the accuracy of the measurements taken increases. By not moving a measurement device from point to point during the process, inaccuracies that might otherwise occur are eliminated. In addition, a person working alone is able to determine level, square and plumb lines simultaneously from a coincidental point. It is particularly advantageous to determine the level, square and plumb lines with beams of light. This eliminates the need for a plumb bob, and does not require that the walls be extensively marked. A single device generating square, level and plumb beams of light allows operation by a single worker.

Several devices are currently commercially available that assist in making level, square and plumb measurements using visible beams of light. However, these devices are somewhat complicated in construction, and therefore expensive to make. The currently available commercial devices typically have one or more laser diodes and complex multi-part optic assemblies. Because of this complexity, such devices may require careful calibration and correction.

Therefore, a need exists for a laser optical system that produces level, square and plumb beams of light from a coincidental point. Such a system should be simple in design but also economical, accurate, efficient, easily manufactured and easily assembled.

BRIEF SUMMARY OF THE INVENTION

According to the present invention, an optical system to produce orthogonal beams is disclosed. A light source generates a beam of laser light which is then focused through a collimating lens and aperture arrangement to produce at least three collimated parallel beams of laser light. These three collimated parallel beams of laser light are shone on an optic. The optic, in turn, reflects and transmits the three collimated parallel beams of laser light to produce at least four orthogonal beams of light. The orthogonal beams of light are oriented and positioned so as to appear to have originated at a single coincident point. In addition, the four orthogonal beams of light generally are of equal power.

The optic is comprised of at least four components bonded together. One of the components is a right angle triangular solid component. The hypotenuse face of the right angle triangular solid component is positioned and coated with a partially reflective material both to reflect and to transmit one of the collimated parallel beams of laser light. Two of the other optic components are right angle trapezoidal solid components. These right angle trapezoidal solid components are each positioned to reflect two of the collimated parallel beams of laser light in opposite directions. The last component is another right angle trapezoidal solid component. The angled face of this right angle trapezoidal solid is positioned adjacent to the hypotenuse face of the right angle triangular solid component coated with the reflective material to form a cuboid. The right angle triangular solid component and right angle trapezoidal solid component have the same refracting index. Therefore, the right angle trapezoidal solid component transmits without refraction the portion of the beam which is transmitted through the right angle triangular component.

In accordance with another embodiment of the present invention, glass straps are used to bond the optic together without the use of adhesive between adjoining optical components.

In accordance with yet another embodiment of the present invention, the right angle triangular solid component has a second face coated with a reflective material both to reflect and transmit one of said collimated beams of laser light whereby an additional orthogonal beam of light is produced along the −x axis.

In accordance with yet another embodiment of the present invention, instead of the reflective material being applied to the hypotenuse face of the right angle triangular solid component, the reflective material is applied to the angled face of the right angle trapezoidal solid component that is positioned adjacent to the hypotenuse face of the right angle triangular solid component.

In accordance with yet another embodiment of the present invention, at least four right angle trapezoidal solid components comprise the optic. The angled face of one of the right angle trapezoidal solid components is positioned adjacent to the angled face of another right angle trapezoidal solid component to form a cuboid. One of the angled faces of the right angle trapezoidal solid components is coated with a reflective material both to reflect and to transmit the incoming collimated beam of laser light. These two right angle trapezoidal solid components comprising the cuboid have the same refraction index. The two other right angle trapezoidal solid components are positioned to reflect beams of laser light in opposite directions.

In accordance with still another embodiment of the present invention, at least four right angle triangular solid components are used to construct the optic. The hypotenuse face of one of the right angle triangular solid components is positioned adjacent to the hypotenuse face of another right angle triangular solid component to form a cube. One of the hypotenuse faces of the right angle triangular solid components is coated with a reflective material both to reflect and to transmit the incoming collimated beam of laser light. The two right angle triangular solid components making up the cube have the same refraction index. The other two right angle triangular solid components are positioned to reflect the collimated beams of laser light in opposite directions.

In accordance with another embodiment of the present invention, at least six right angle triangular solid components are arranged to form a cuboid optic. The cuboid shape increases the ease of both manufacture and assembly.

Accordingly, it is an object of the present invention to have a device comprising a single laser source and a simple optic that accurately produces four orthogonal beams, originating from a common point. The optic is simple in construction, easily manufactured and does not require complicated calibration or adjustment. Because the design of the optic is simple, the cost of the optic components is minimized.

Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals, and in which.

DETAILED DESCRIPTION OF THE PREFERRED EMBODIMENTS

Figure 1:
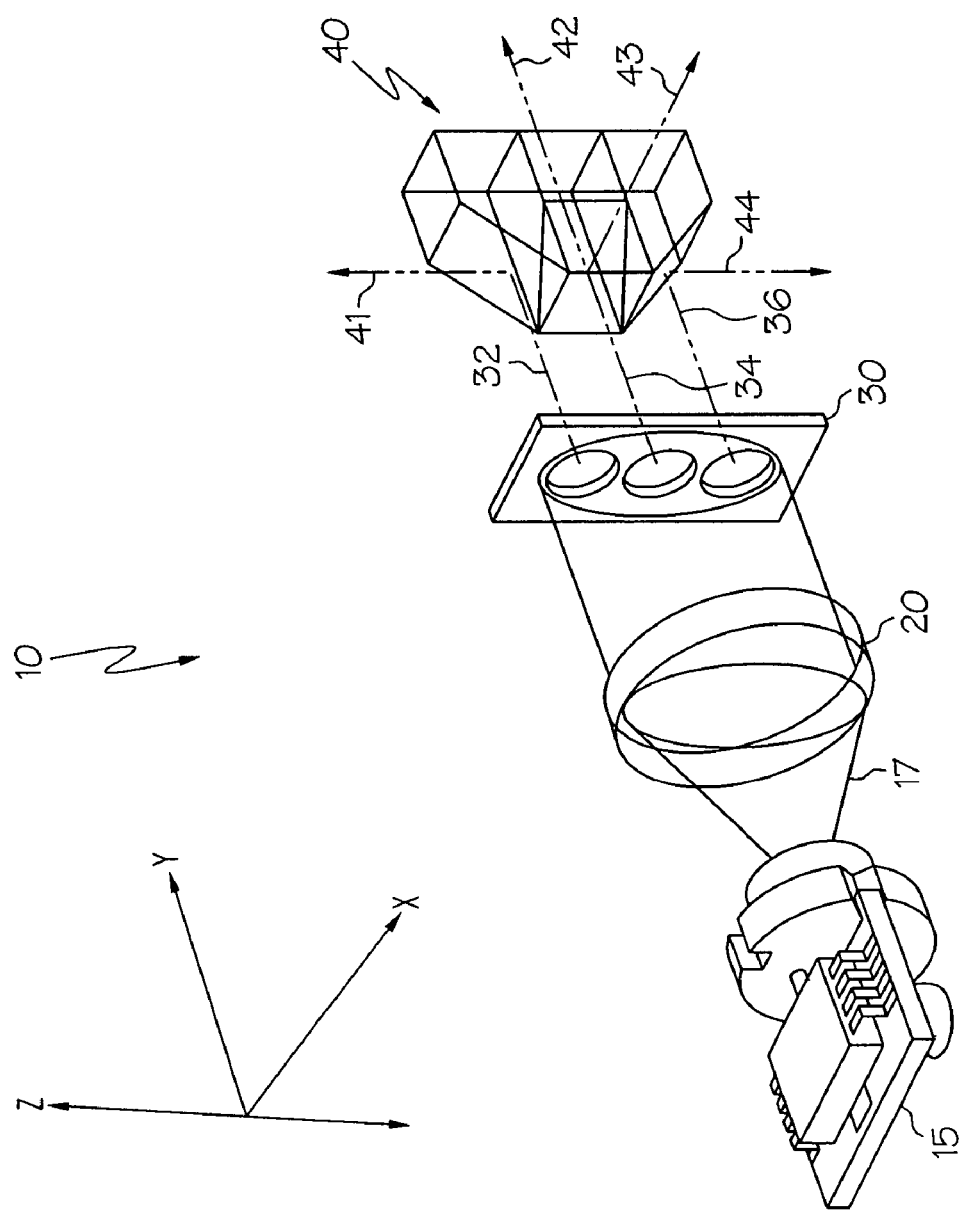
FIG. 1 is a schematic representation of the system comprising a laser diode, a collimating lens, an aperture, and a simple optic for the generation of four orthogonal beams according to an embodiment of the present invention.

FIG. 1 illustrates a system 10 comprising a single light source 15 generating a beam of light 17 that shines on an optic 40. The optic 40, in turn, produces four orthogonal beams 41, 42, 43, 44 which are oriented and aligned so as to appear to be originating from a single coincident point within the optic 40. The light source 15 is preferably a laser diode which generates a beam of light 17 which is generally elliptical in cross-section. The beam of light 17 is projected generally along the y-axis. The elliptical beam of laser light 17 passes through a collimating lens 20 and in conjunction with an aperture 30 produces three parallel, collimated beams of laser light 32, 34, and 36. Beam 34, the "Level" beam, has approximately half the power of the sum of the apertured beams 17. Beams 32 and 36, the "Plumb" beams, each have approximately a quarter of the power of the sum of the apertured beams 17. The three beams 32, 34 and 36 are projected onto the optic 40. The optic 40 both reflects and transmits the three beams 32, 34 and 36 to produce four orthogonal beams 41, 42, 43, 44 of about equal power, oriented and aligned to appear to be originating from a single coincident point within the optic 40.

The optic 40 is comprised of optical components. Each optical component has a simple geometric shape. The optical components can be comprised of borosilicate crown glass such as, for example, BK7 glass. The optical components may preferably have an optical surface flatness of a quarter wavelength at 635 nm.

Figure 2A:
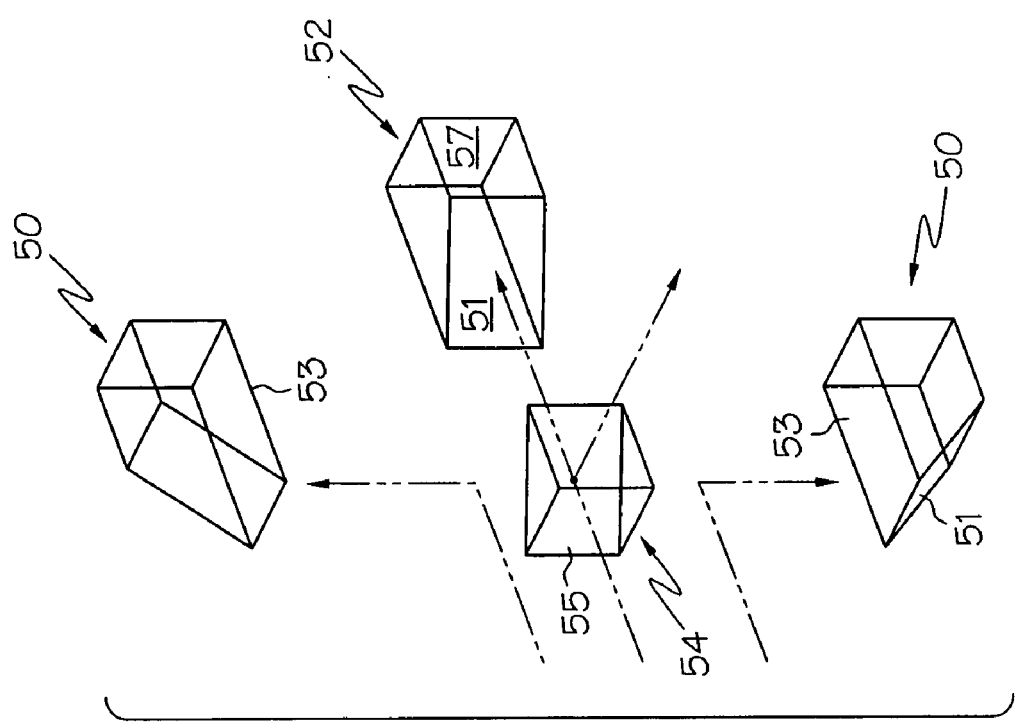
FIG. 2A is an exploded view of the optic of FIG. 2.
Figure 2:
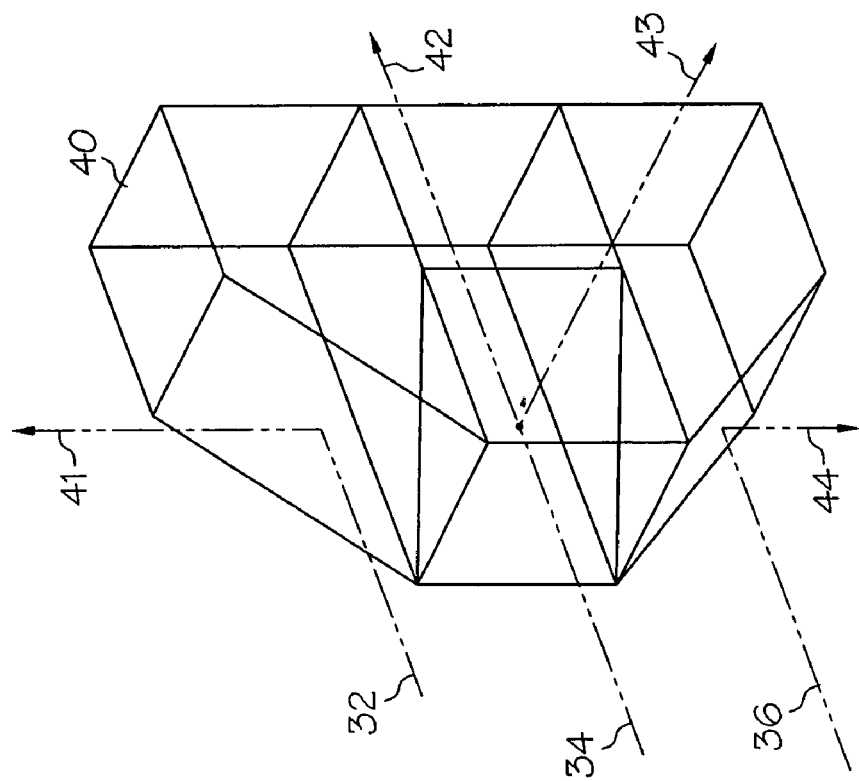
FIG. 2 is a perspective view of the optic of the system comprised of three right angle trapezoidal solid components and one right angle triangular solid component that generates four orthogonal beams from a coincident point according to an embodiment of the present invention.

In one embodiment, referring now to FIGS. 2 and 2A, four optical components of two simple geometric shapes are used to create the optic 40. One optical component is a right angle triangular solid 54, the beam splitter optic. The beam splitter optic 54 is preferably designed to operate between wavelengths of about 620 nm and 650 nm, and is preferably designed for S polarization along the hypotenuse face 55 of the right angle triangular solid 54. The other faces of the right angle triangular solid 54 preferably have a multi layer dielectric anti-reflective (AR) coating which preferably allows greater than about 97% transmission of the laser light therethrough. The right angle triangular solid 54 is a five-sided solid comprised of two right angle triangular faces and three rectangular faces.

The three other optical components of the optic 40 are right angle trapezoidal solids 50, 52. The right angle trapezoidal solids 50, 52 are six-sided solids comprising two right angle trapezoidal faces and four rectangular faces. The right angle trapezoidal solids 50, 52 are preferably designed to operate at a wavelength of between about 620 nm and 650 nm with a preferable wavelength of 635 nm. The angled face 51 of the right angle trapezoidal solid 50, 52 is oriented at 45° from the opposite face. Two right angle trapezoidal solids 50, the 90-degree optics, are positioned to reflect the two quarter power "Plumb" beams 32, 36 from their angled faces 51 in opposite directions 41, 44 to form a plumb line along the z-axis. Each angled face 51 preferably has a protected enhanced aluminum coating with a reflectivity of preferably greater than about 93% for P polarization with preferably less than about 0.05% transmission of laser light. The third right angle trapezoidal solid 52, the level optic, is positioned so that its angled face 51 is adjacent to and abuts the hypotenuse face 55 of the beam splitter optic 54. The two solids together form a cuboid. This cuboid is positioned between the longer of the two parallel faces 53 of the two 90-degree optics 50. The straight, non-parallel side 57 of the level optic 52 is preferably coated with the multi layer dielectric AR coating. Because both the right angle triangular solid 54 and the right angle trapezoidal solids 50, 52 are simple geometric shapes, both manufacturing the optic components and assembling the optic 40 is easier and less expensive.

In one embodiment, the hypotenuse face 55 of the beam splitter optic 54 is coated with a reflective material. In another embodiment, the angled face 51 of the level optic 52 is coated with the reflective material. In either instance, the reflective material splits an incoming Level beam 34 in half at a 45° angle of incidence. Half of the incoming Level beam 34 will be transmitted through the level optic 52 along the y-axis, forming the level beam 42 with approximately one half of the power of the incoming Level beam 34 or a quarter of the power of the sum of the apertured beams 17. The other half of the incoming Level beam 34 is reflected from the partially reflective material at a ninety degree angle along the x-axis, forming the square beam 43 with approximately one quarter of the power of the incoming Level beam 34 or a quarter of the power of the original beam of light 17. Because the level optic 52 has the same index of refraction as the beam splitting optic 54, there will be no refraction of the transmitted beam 42 at the interface between level optic 52 and beam splitter optic 54. As a result, the transmitted beam 42 exits the level optic 52 in a direction that is orthogonal to the reflected beam 43.

Figure 3:
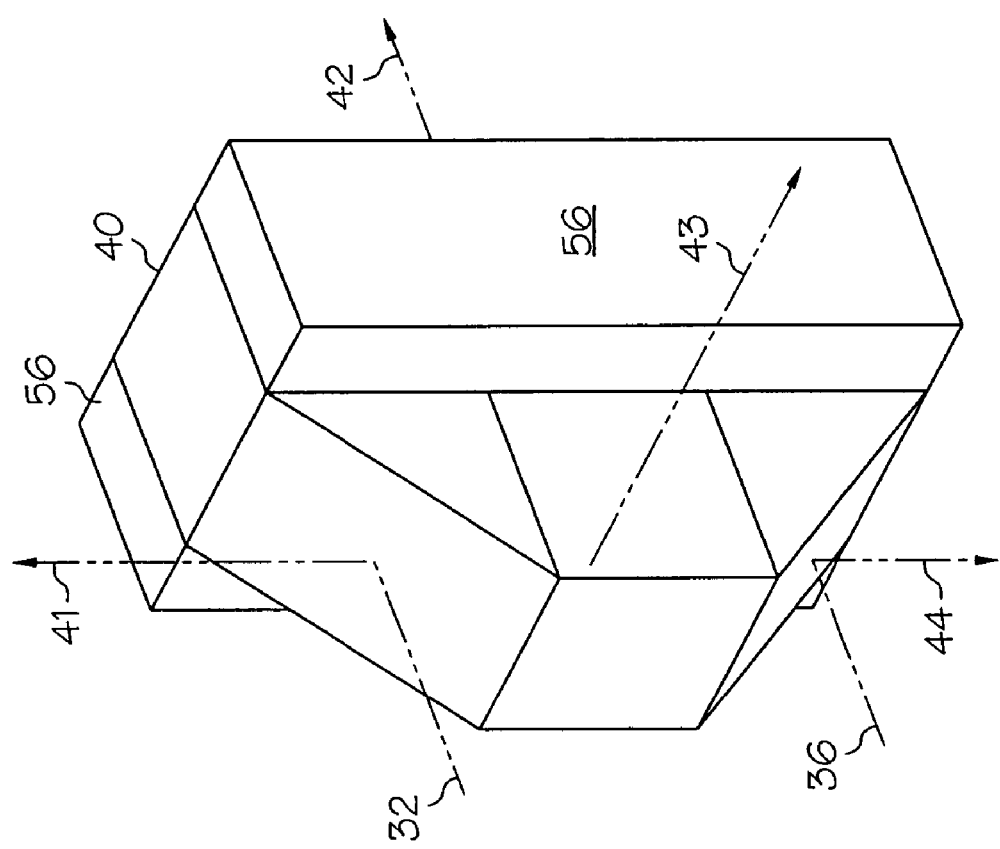
FIG. 3 is a perspective view of the optic of the system bonded with glass straps according to another embodiment of the present invention.

The components 50, 52, 54 of the optic 40 may be bonded together with an adhesive. The adhesive is applied so as not to interfere with the transmission and reflection of the incoming beams 32, 34, 36. In another embodiment, shown in FIG. 3, the components 50, 52, 54 of the optic 40 are bonded together by the use of glass straps 56. The glass straps 56 are typically attached to components of optic 40, providing additional structural integrity. The glass straps 56 are bonded to components 50, 52 and 54 by adhesive. The adhesive between the glass straps 56 and optical components 50, 52, 54 replaces the adhesive between the adjoining faces of the components 50, 52 and 54. By eliminating adhesive between adjoining faces, the manufacturable accuracy of the orthogonal beams 41, 42, 43, 44 is improved.

Figure 4A:
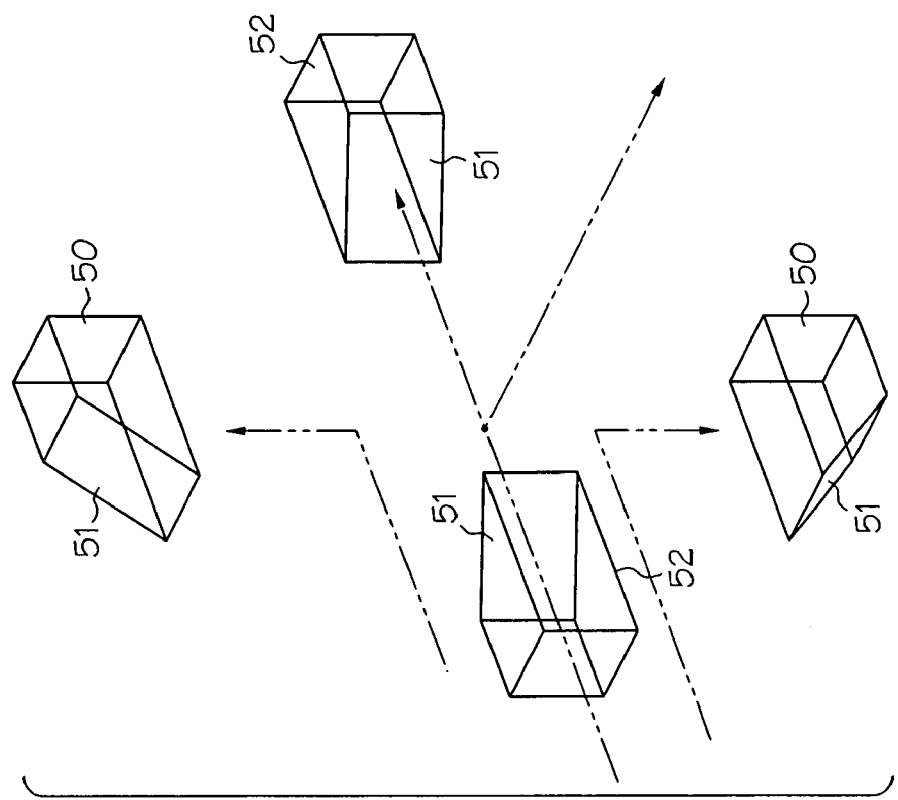
FIG. 4A is an exploded view of the optic of FIG. 4.
Figure 4:
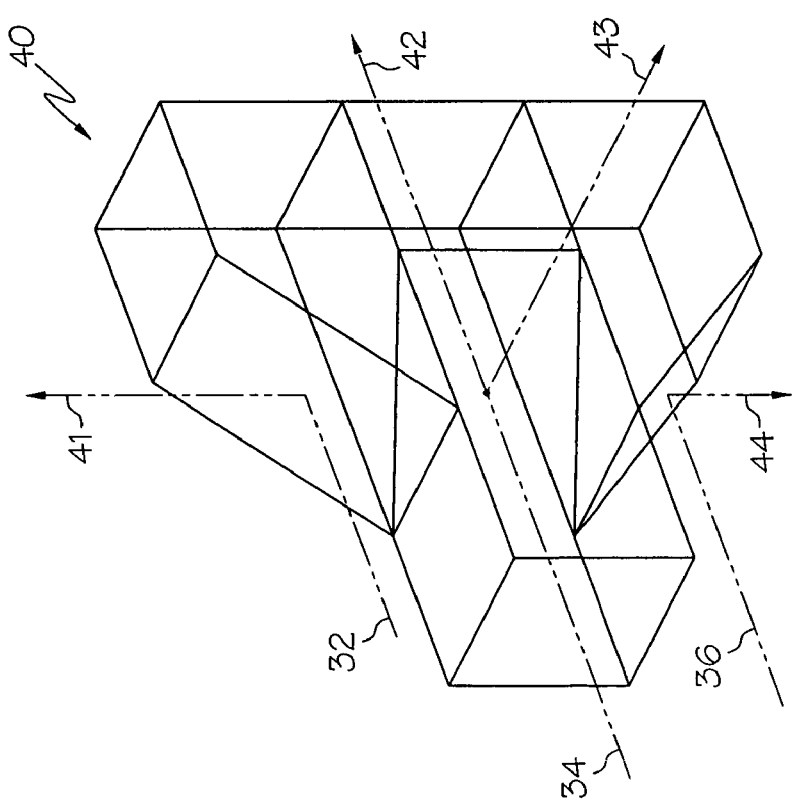
FIG. 4 is a perspective view of the optic of the system comprised of four right angle trapezoidal solid components according to another embodiment of the present invention.
Figure 5:
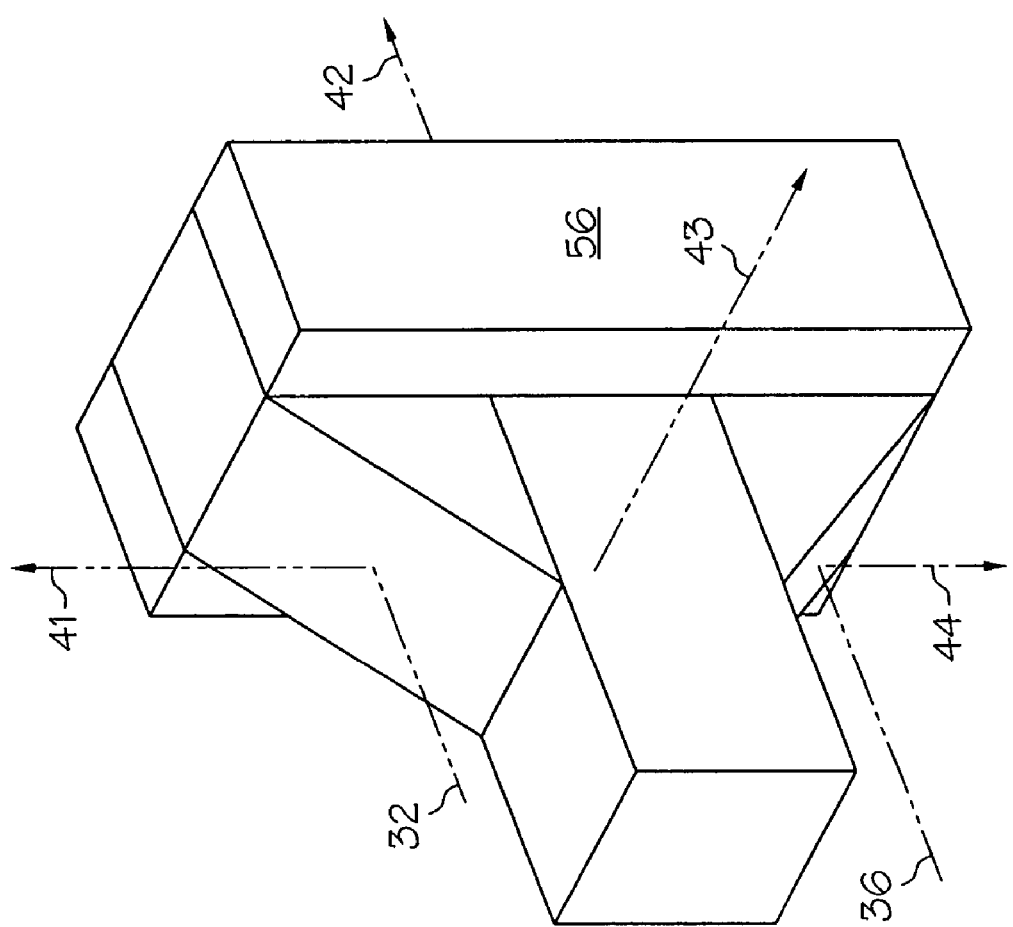
FIG. 5 is a perspective view of the optic of the system comprised of four right angle trapezoidal solid components bonded by the use of glass straps according to another embodiment of the present invention.

FIGS. 4 and 4A illustrate another embodiment of the present invention. In this embodiment, the four components comprising the optic 40 are all of the same geometric shape, the right angle trapezoidal solid shape that was used for three of the components of the previous embodiment. In this embodiment, another level optic 52 replaces the beam splitting optic 54 of FIG. 2 to form the cuboid. This cuboid is similar to the one described above under FIG. 2, albeit this cuboid is slightly longer along the y-axis. As was described above in FIG. 2, this cuboid is also positioned between the longer parallel sides of the two ninety-degree optics 50. One of the angled faces 51 of the two level optic 52 is coated with the partially reflective material to produce the transmitted and reflected beams 42, 43. Again, the four optic components 50, 52 of the optic 40 can be bonded together by either adhesive, or by glass straps 56 in conjunction with adhesive, as illustrated in FIG. 5.

Figure 6A:
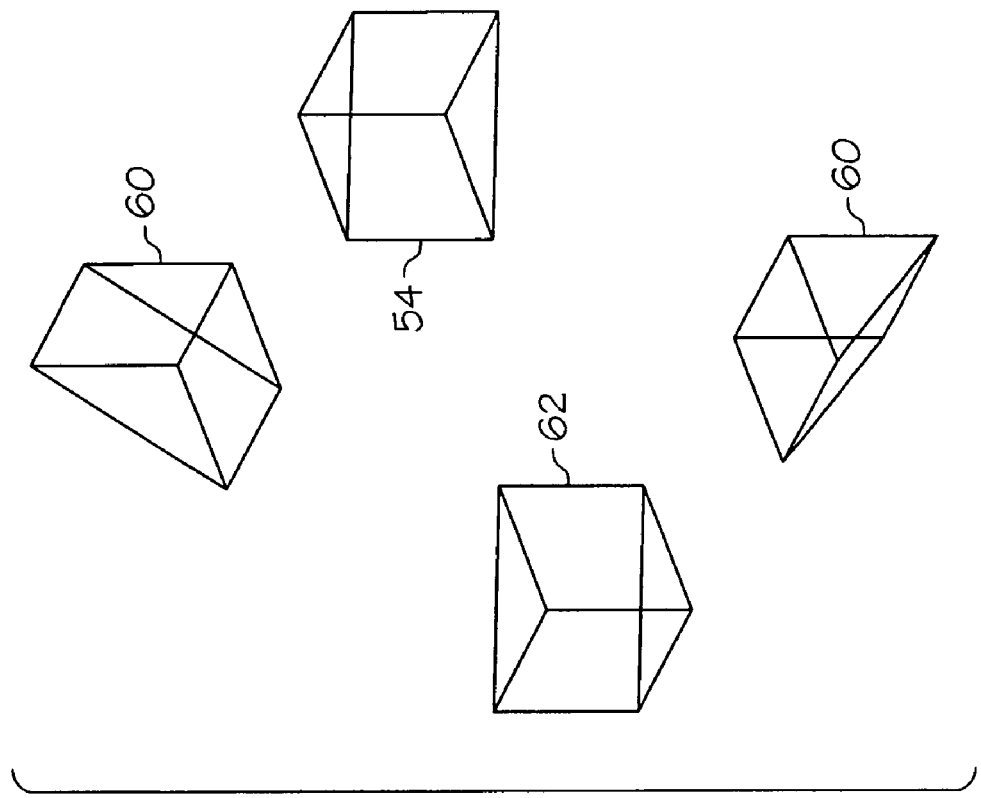
FIG. 6A is an exploded view of the optic of FIG. 6.
Figure 6:
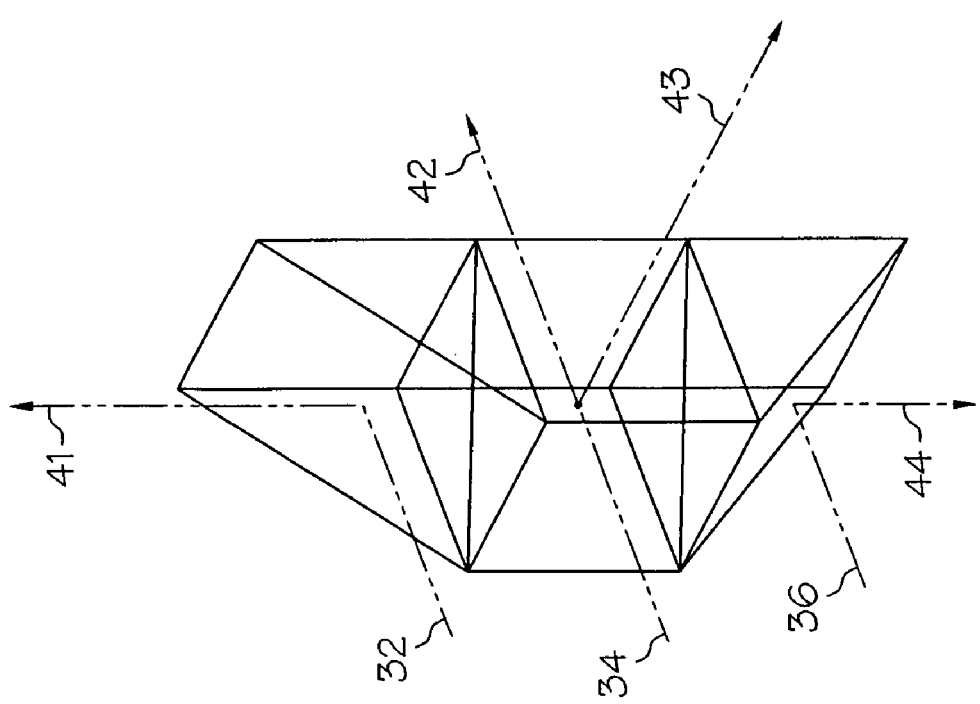
FIG. 6 is a perspective view of the optic of the system comprised of four right angle triangular solid components according to another embodiment of the present invention.

FIGS. 6 and 6A illustrate yet another embodiment of the optic 40. In this embodiment, instead of using four right angle trapezoidal solids 50, 52 to form the optic 40 as described above for FIG. 4, four right angle triangular solids 54, 60, 62 are used. Two right angle triangular solids 60 are coated in the same manner as the ninety-degree optics 50 discussed above for FIG. 2 in order to reflect beams 32 and 36 at ninety degrees to produce the reflected beams 41 and 44 along the z-axis. In addition, another right angle triangular solid 62 replaces the level optic 52 to form a cube which is positioned between the two right triangular solids 60. One of the hypotenuse faces of the two right triangular solids 54, 62 is coated with partially reflective material to produce the transmitted and reflected beams 42, 43 in the same manner as discussed above.

Figure 7A:
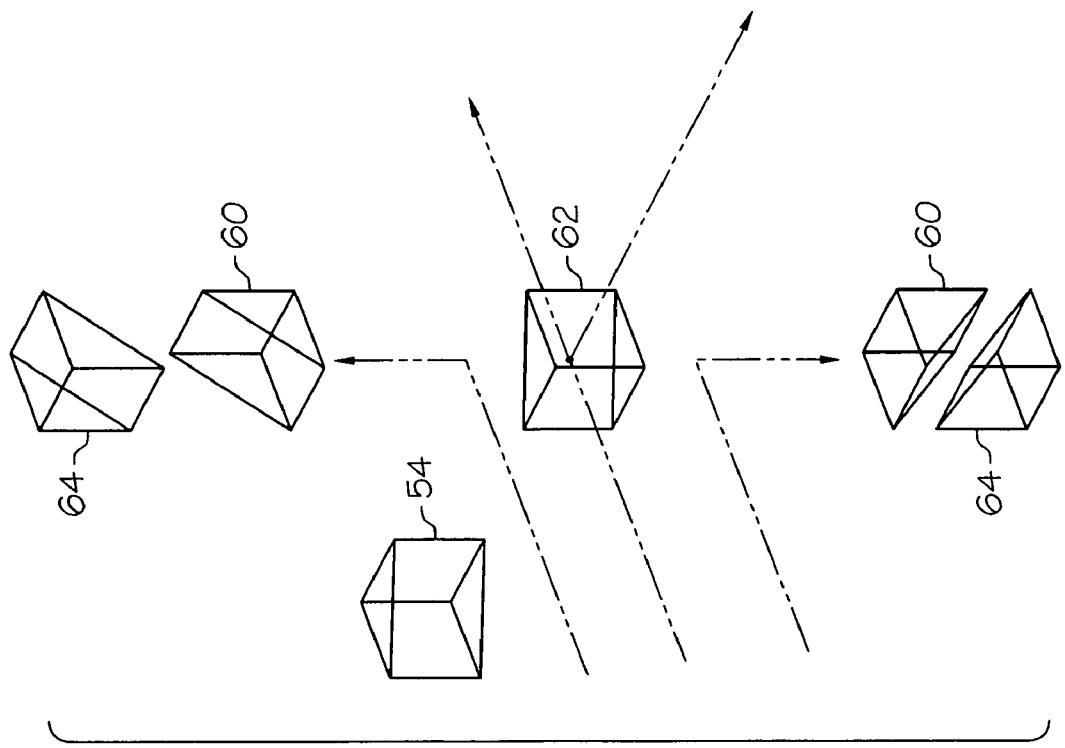
FIG. 7A is an exploded view of the optic of FIG. 7.
Figure 7:
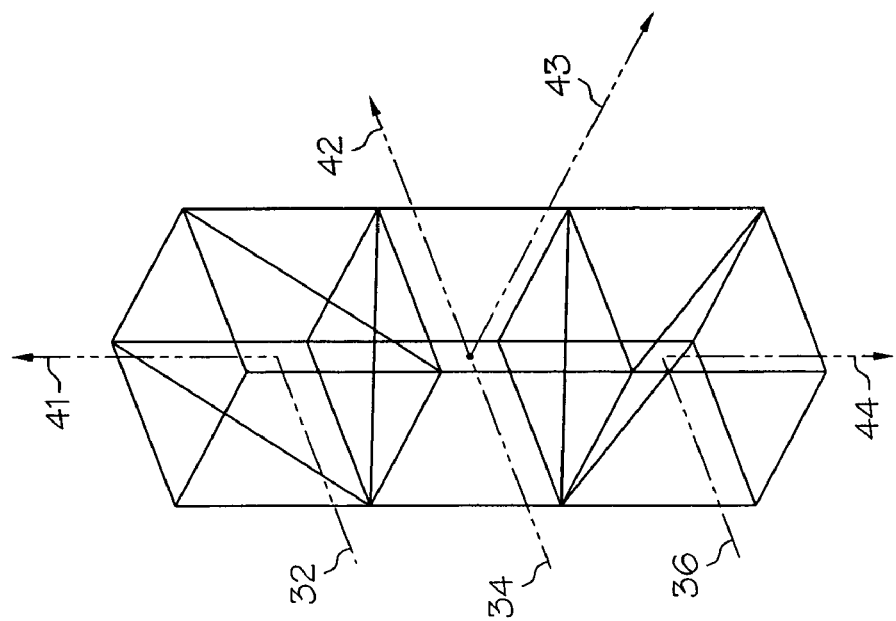
FIG. 7 is a perspective view of the optic of the system comprised of six right angle triangular solid components which form a cuboid optic according to another embodiment of the present invention.

Another embodiment of the optic 40 of the present invention, illustrated in FIGS. 7 and 7A, builds on the optic 40 discussed above in FIG. 6. In this embodiment, six right angle triangular solids 54 are used to create a cuboid optic 40. This is accomplished by adding two additional right angular triangular solids 64 to the optic 40. The two right angular triangular solids 64 are positioned on the triangular ninety-degree optics 62 to form cubes. Adding the two right angular triangular solids 64 results in three cubes stacked on top of each other to form a cuboid. Due to its simple geometry, a cuboid optic 40 simplifies manufacturing and assembling of the system 10, thereby reducing the overall cost of the system 10.

Figure 8A:
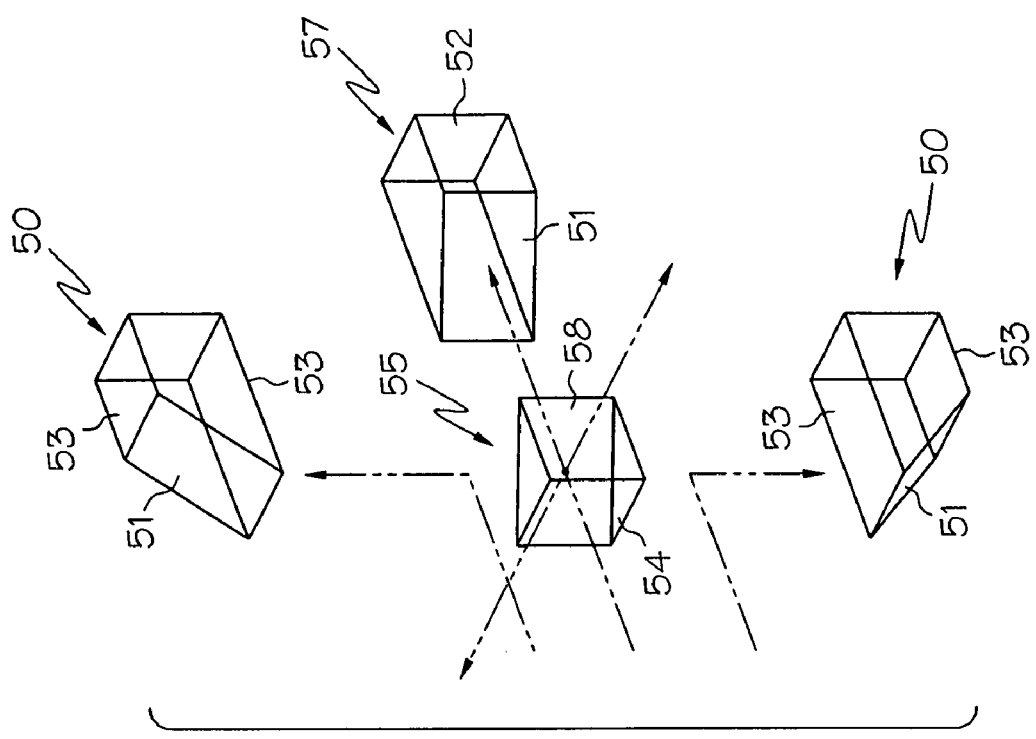
FIG. 8A is an exploded view of the optic of FIG. 8.
Figure 8:
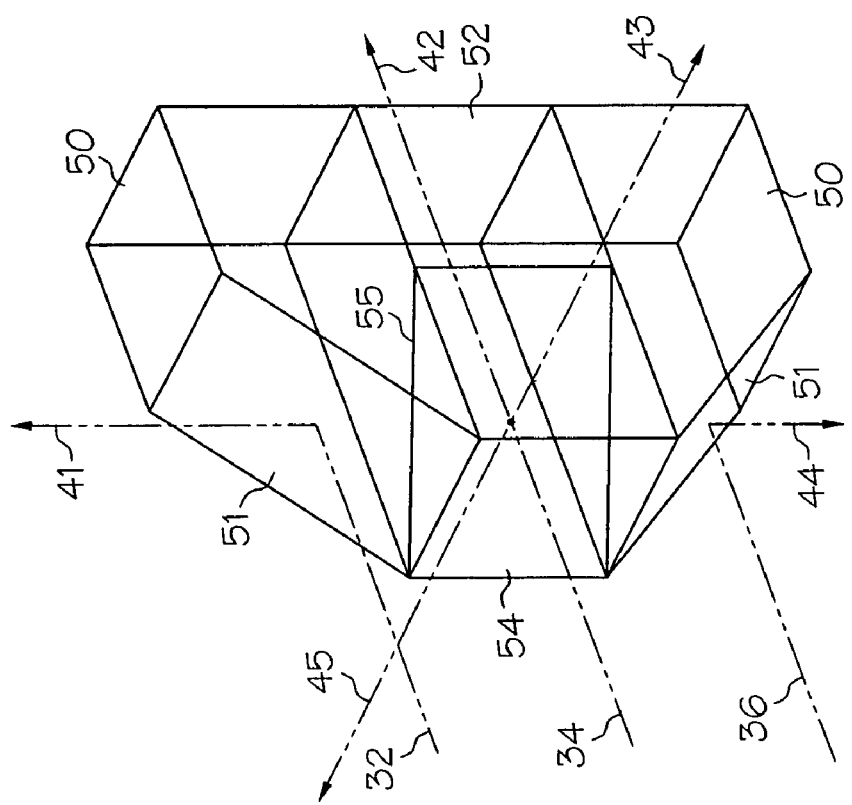
FIG. 8 is a perspective view of the optic of the system comprised of three right angle trapezoidal solid components and one right angle triangular solid component that generates five orthogonal beams from a coincident point according to another embodiment of the present invention.

FIGS. 8 and 8A illustrate yet another embodiment of optic 40. In this embodiment, the arrangement of the four optic components 50, 52, 54 is the same as illustrated in FIG. 2. However, in this embodiment, two faces are coated with the reflective material. In one embodiment, the two coated faces are the hypotenuse face 55 of the right angle triangular solid 54 and the face 58 of the right angle triangular solid 54 that the incoming Level beam 34 is not transmitted through. In another embodiment, the two coated faces are the angled face 51 of the level optic 52 and the non-hypotenuse face 58 of the right angle triangular solid 54 that the incoming Level beam 34 is not transmitted through. By coating the additional face 58 of the right angle triangular solid 54 with the reflective material, a fifth orthogonal beam 45 is produce along the −x axis and in the opposite direction of reflected beam 43. The reflective material coatings on the faces 58 and 55 can be manipulated to achieve varying power ratios of beams 42, 43, 45 relative to the incident beam 34.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A system to produce orthogonal beams, the system comprising:
   a light source for generating a beam of laser light;
   a collimating lens and aperture arrangement producing at least three collimated, apertured parallel beams of laser light; and
   an optic to receive the three collimated parallel beams of laser light, reflecting and transmitting the three collimated parallel beams of laser light to produce at least four orthogonal beams of light, said orthogonal beams of light being oriented and positioned so as to appear to have originated at a single coincident point, and said four orthogonal beams of light being generally equal in power, wherein the power of two of said collimated, apertured, parallel beams of laser light is approximately one fourth of the total power of the apertured beams of laser light produced by said light source, and another of said collimated, apertured, parallel beams of laser light has approximately half the total power of the apertured beams of laser light produced by said light source.

2. The system of claim 1, wherein said light source comprises a light emitting diode.

3. The system of claim 1, wherein said light source comprises a laser diode.

4. The system of claim 1, wherein the optic comprises:
   at least six right angle triangular solid components, wherein one of the right angle triangular solid components is positioned and coated with a reflective material both to reflect and to transmit one of said parallel beams of laser light, and wherein the at least six right angle triangular solid components are arranged to form a cuboid.

5. The system of claim 1, wherein said optic is comprised of components.

6. The system of claim 5, wherein said components comprise geometric solids of optical material.

7. The system of claim 5, wherein said components of the optic are bonded together by an optical adhesive.

8. The system of claim 5, wherein said components of the optic are held together by glass straps, secured to said components.

9. The system of claim 1, wherein the optic comprises:
a right angle triangular solid component, wherein the right angle triangular solid component hypotenuse face is positioned and coated with a reflective material both to reflect and to transmit one of said collimated parallel beams of laser light;
at least two right angle trapezoidal solid components, wherein the right angle trapezoidal solid components are each positioned to reflect one of said collimated parallel beams of laser light, said two right angle trapezoidal solid components reflecting beams in opposite directions; and
a right angle trapezoidal solid component that is positioned adjacent to the hypotenuse face of the right angle triangular solid component coated with the reflective material, wherein the right angle triangular solid component and right angle trapezoidal solid component have the same refracting index and wherein the right angle trapezoidal solid component transmits without refraction the portion of the beam which is transmitted through said right angle triangular component.

10. The system of claim 9, wherein said at least two right angle trapezoidal solid components each have a reflective coating on an angled face to reflect a collimated beam.

11. The system of claim 9, wherein the reflective material comprises a 50/50 beamsplitter coating designed for a 45° angle of incidence.

12. The system of claim 9, wherein the level right angle trapezoidal solid component has an anti-reflective coating on its straight non-parallel face.

13. The system of claim 9, wherein the right angle triangular solid component has an anti-reflective coating on its non-hypotenuse faces.

14. The system of claim 9 in which said right angle triangular solid component has a second face coated with a partially reflective material both to reflect and transmit one of said collimated beams of laser light whereby an additional orthogonal beam of light is produced.

15. The system of claim 1, wherein to optic comprises:
a right angle triangular solid component;
at least two right angle trapezoidal solid components, wherein the right angle trapezoidal solid components are each positioned to reflect one of said collimated parallel beams of laser light, said two right angle trapezoidal components reflecting beams in opposite directions; and
a right angle trapezoidal solid component that is positioned adjacent to the right angle triangular solid component, the side adjacent to to right angle triangular solid component being coated with a partially reflective material both to reflect and to transmit the incoming portion of the collimated beam of laser light, wherein the right angle triangular solid component and right angle trapezoidal solid component have the same refraction index and wherein the right angle trapezoidal solid component transmits without refraction the portion of the beam which is transmitted through said right angle triangular component.

16. The system of claim 1, wherein the optic comprises:
at least four right angle trapezoidal solid components, wherein one of the right angle trapezoidal solid components is positioned adjacent to another right angle trapezoidal solid component, and wherein one of the sides adjacent to where the right angle trapezoidal solid components meet is coated with a partially reflective material both to reflect and to transmit the incoming collimated beam of laser light, wherein the two right angle trapezoidal solid components have the same refraction index, and wherein two right angle trapezoidal solid components are positioned to reflect beams of laser light in opposite directions.

17. The system of claim 1, wherein the optic comprises:
at least four right angle triangular solid components, wherein one of the right angle triangular solid components is positioned adjacent to another right angle triangular solid component, and wherein one of the sides adjacent to where the right angle triangular solid components meet is coated with a reflective material both to reflect and to transmit the incoming collimated beam of laser light, wherein the two right angle triangular solid components have the same refraction index, and wherein two right angle triangular solid components are positioned to reflect the beams of laser light in opposite directions.

* * * * *